(12) United States Patent
Nhan et al.

(10) Patent No.: US 7,341,612 B2
(45) Date of Patent: Mar. 11, 2008

(54) DISPOSABLE VACUUM BAGS

(75) Inventors: Davis Dang Hoang Nhan, Appleton, WI (US); Rongguo Zhao, Neenah, WI (US); William Hung Nguyen, New Brighton, MN (US)

(73) Assignee: ZNN Technologies, LLC, Appleton, WI (US)

( * ) Notice: Subject to any disclaimer, the term of this patent is extended or adjusted under 35 U.S.C. 154(b) by 347 days.

(21) Appl. No.: 11/017,989

(22) Filed: Dec. 21, 2004

(65) Prior Publication Data

US 2005/0132676 A1 Jun. 23, 2005

Related U.S. Application Data

(60) Provisional application No. 60/531,172, filed on Dec. 22, 2003.

(51) Int. Cl.
*B01D 46/00* (2006.01)

(52) U.S. Cl. .............................. 55/373; 55/375; 55/378; 55/DIG. 2; 55/DIG. 3; 95/273; 15/314; 15/315; 15/347; 15/348; 15/349; 15/353

(58) Field of Classification Search ................. 55/373, 55/375, 378, DIG. 2, DIG. 3; 95/273; 15/314, 15/315, 347, 348, 349, 353
See application file for complete search history.

(56) References Cited

U.S. PATENT DOCUMENTS

| | | | | | |
|---|---|---|---|---|---|
| 5,472,460 | A | * | 12/1995 | Schmierer | 55/367 |
| 5,472,465 | A | * | 12/1995 | Schmierer | 55/367 |
| 5,725,619 | A | * | 3/1998 | Brule et al. | 55/367 |
| 5,792,224 | A | * | 8/1998 | Fu et al. | 55/375 |
| 6,461,394 | B1 | * | 10/2002 | Mattsson | 55/374 |
| 6,902,594 | B2 | * | 6/2005 | Cho | 55/373 |

* cited by examiner

*Primary Examiner*—Duane Smith
*Assistant Examiner*—Minh-Chau T. Pham
(74) *Attorney, Agent, or Firm*—Brendan C. Babcock; Babcock Legal Services PLLC

(57) ABSTRACT

A disposable open bag for a power tool such as a Shop-Vac cleaner has a mounting plate with an opening for receiving debris from the intake of the power tool. The mounting plate is also provided with a vent opening(s), e.g., to prevent the bag from closing in on the air filter and blocking the airflow. The said bag provides a cleaner and more convenient means of collection of the debris, leaves, and particulate matters directly into the bag.

10 Claims, 6 Drawing Sheets

DISPOSABLE VACUUM BAGS

CROSS-REFERENCE TO RELATED APPLICATIONS

This application claims the benefit of U.S. Provisional Application No. 60/531,172, filed Dec. 22, 2003, which is hereby incorporated by reference in its entirety.

BACKGROUND OF THE INVENTION

The present invention relates to a disposable bag that is used with a shop vacuum cleaner for collecting and bagging debris, leaves, and particulates A typical shop vacuum cleaner available in the market does not require a collecting bag for dry pick-up. However, when the shop vacuum's tank is full, it is a messy, dusty and a respiratory health hazard operation to empty it into a disposable plastic bag or a trash container.

There are disposable bags available in the market for shop vacuum cleaners manufactured by Shop-Vac Corporation, of Williamsport, Pa. However, these are typically closed filter paper bags that are designed for dry pick-up of fine dust or particulates. These bags are similar to disposable vacuum bags for upright vacuum cleaners. They are expensive, and when they are full, it is still a messy operation to remove them. Furthermore, they are not suitable to collect large debris, such as leaves or wood chips due to limited space available within a close bag.

Therefore, it would be cleaner and more convenient to have an open plastic bag inside a shop vacuum cleaner's tank to collect debris, such as collecting leaves, lawn debris, wood dust, and other loose particulates directly into the bag. Open plastic bags designed to fit a shop vacuum cleaner are available in the market manufactured by Roebuck and Co., of Hoffman Estates, Ill. under the trade name Craftsman™. The Craftsman disposable bag is a plastic trash bag, and they are made to fit a specific size of a shop vacuum cleaner's tank. However, the user has to cut a hole on the bag to attach it to the inlet of a shop vacuum cleaner's tank. If the hole is not properly cut, filter clogging by the bag and failure of collecting debris, leaves, and particulates in the bag may result. It is not convenient to use, and there is a need for improvement.

DESCRIPTION OF THE INVENTION

It is an objective of the invention to provide an improved disposable open bag for shop vacuum cleaners with avoids the aforementioned disadvantage.

It is another object of the present invention to provide a disposable open bag that can be conveniently used with a shop vacuum cleaner for both dry and wet pick-up.

It is another object of the present invention to provide a means to prevent the disposable open bag from being drawn toward the vacuum motor and blocking the air flow.

Examples of disposable open bags of the present invention are described in detail with reference to FIGS. 1-6, wherein like numbers represent like parts throughout the views.

Figure 1:
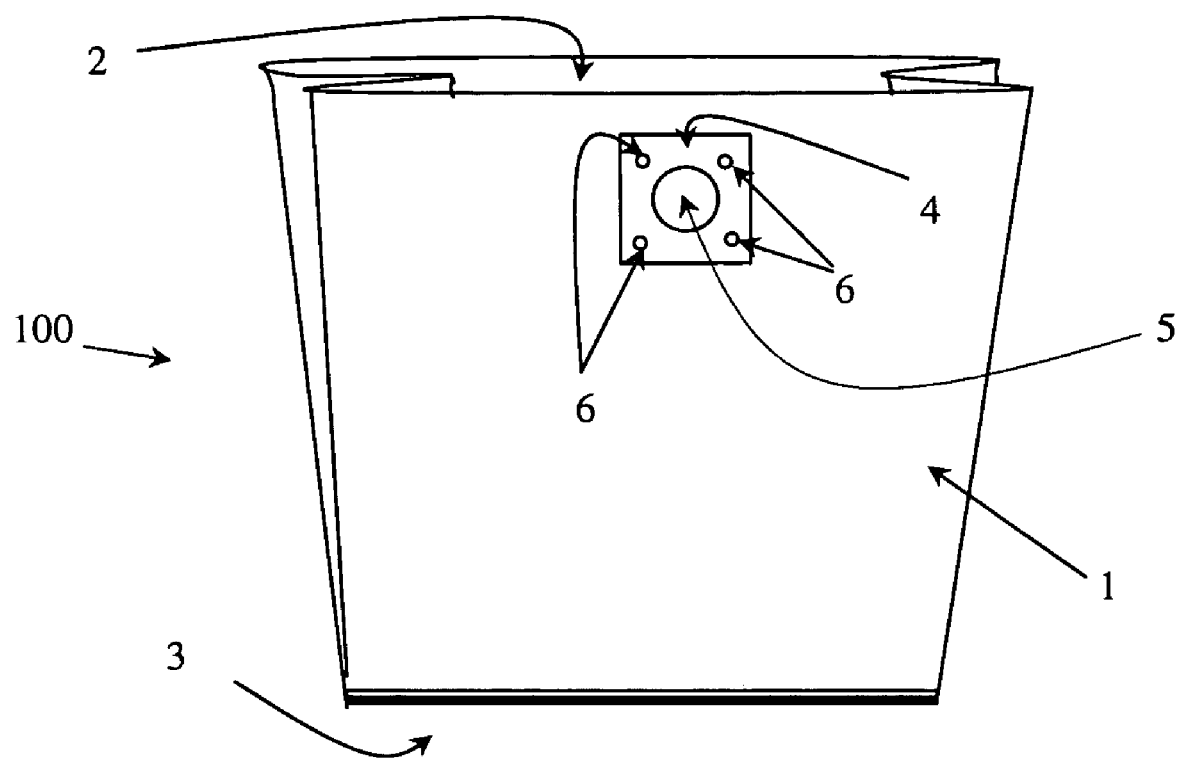
FIG. 1 shows a perspective view of a disposable open bag of one embodiment of the present invention, illustrating the structure before being attached to the inlet of a shop vacuum cleaner.
Figure 2:
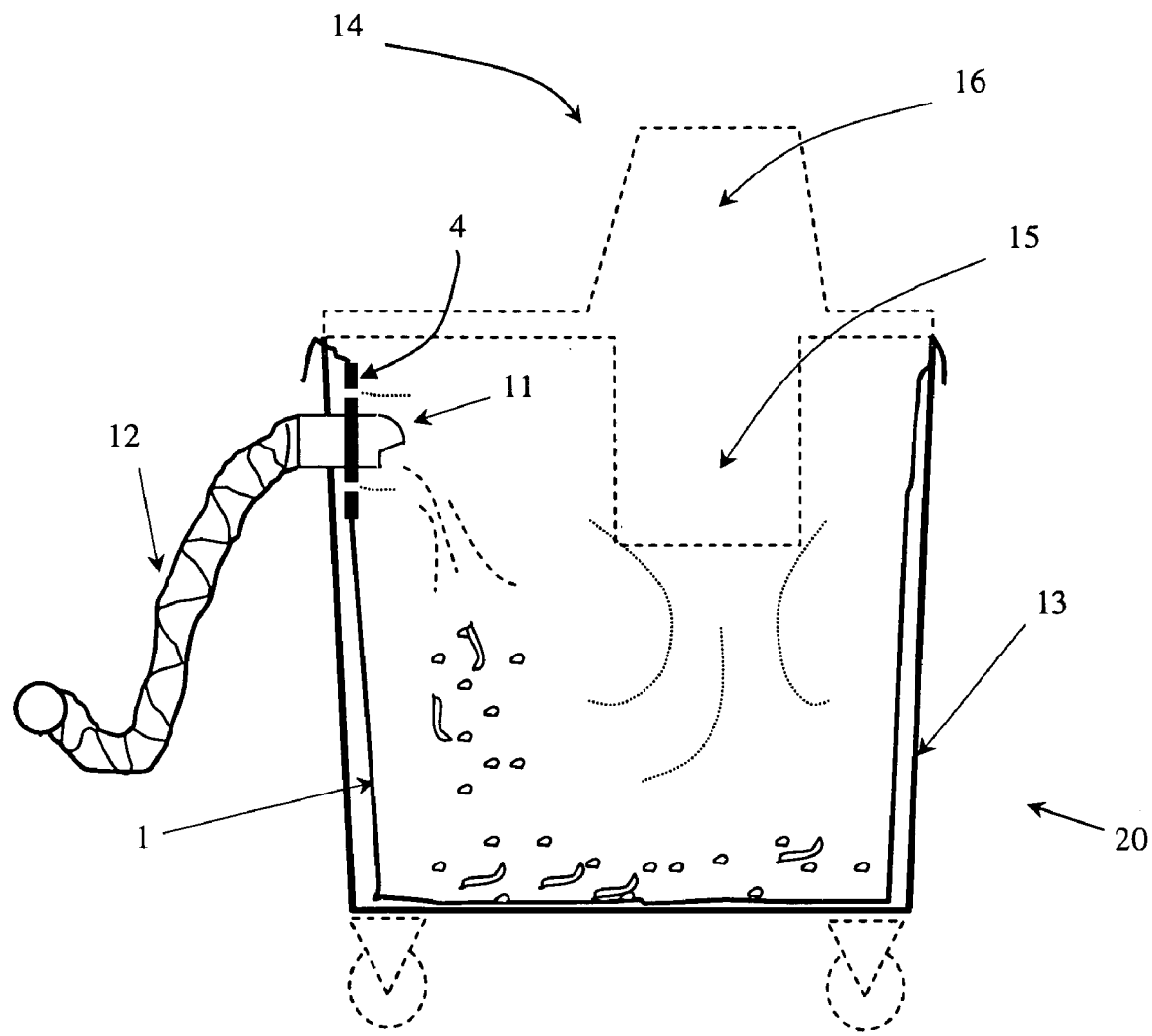
FIG. 2 shows a cross section view of a disposable open bag of one embodiment of the present invention, illustrating the bag structure being attached to the inlet of a shop vacuum cleaner, and being filled with air, debris, and particulates.
Figure 3:
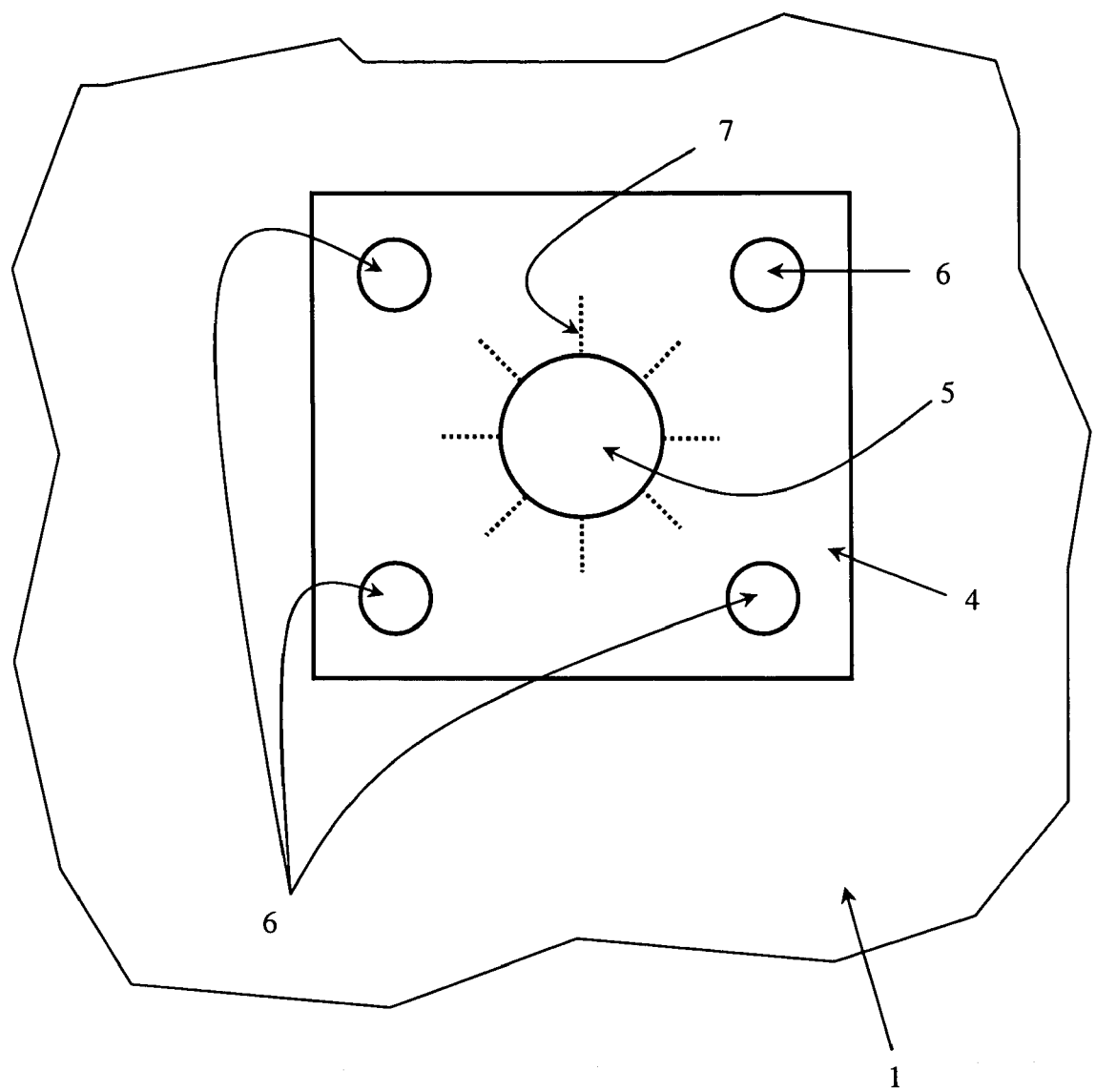
FIG. 3 shows a mounting plate of a disposable open bag of the present invention.

Referring to FIG. 1, a disposable open bag 100 of the present invention has a body 1, an open end 2 and a close end 3, which is very much like an ordinary plastic trash bag. However, the body 1 can be further provided with a connection means, such as a mounting plate 4. The mounting plate 4 is attached to the body 1 by any known methods in the art, such as adhesive, thermal bonding, ultrasonic bonding or stapling. The mounting plate 4 can be attached to the outside or the inside of the body 1. At the location where the mounting plate 4 is attached to the body 1, hole(s) are cut on the body 1 that match with the hole(s) on the mounting plate 4. The mounting plate 4 is provided with an opening 5, through which air and entrained debris enter the bag 100 from the shop vacuum cleaner inlet (intake) 11 (See FIG. 2). The function of the mounting plate 4 is to facilitate the ease of bag installation and to secure the body 1 to the inlet 11 during vacuum operation. The mounting plate 4 can have any shape, such as square, rectangular, circle or oval. The opening 5 can have a circular shape.

The diameter of the opening 5 is preferably smaller than the outside diameter of the shop vacuum cleaner inlet 11. The opening 5 could have perforated lines 7 in a manner shown in FIGS. 3 and 4. This allows a tight fit of the mounting plate 4 on the inlet 11. Thus, it secures the mounting plate 4 on the inlet 11.

The mounting plate 4 can be further provided with at least one vent opening(s) 6, through which air pressure is allowed to equalize between inside and outside of the bag 100, e.g., to remove air from between the inner wall of the tank 13, and the outer wall of the bag 100. A function of the vent opening(s) 6 is to minimize air pressure gradient or difference between inside and outside of the bag 100. Therefore, it can prevent the body 1 from closing in on the air filter 15 and blocking the airflow.

Figure 4:
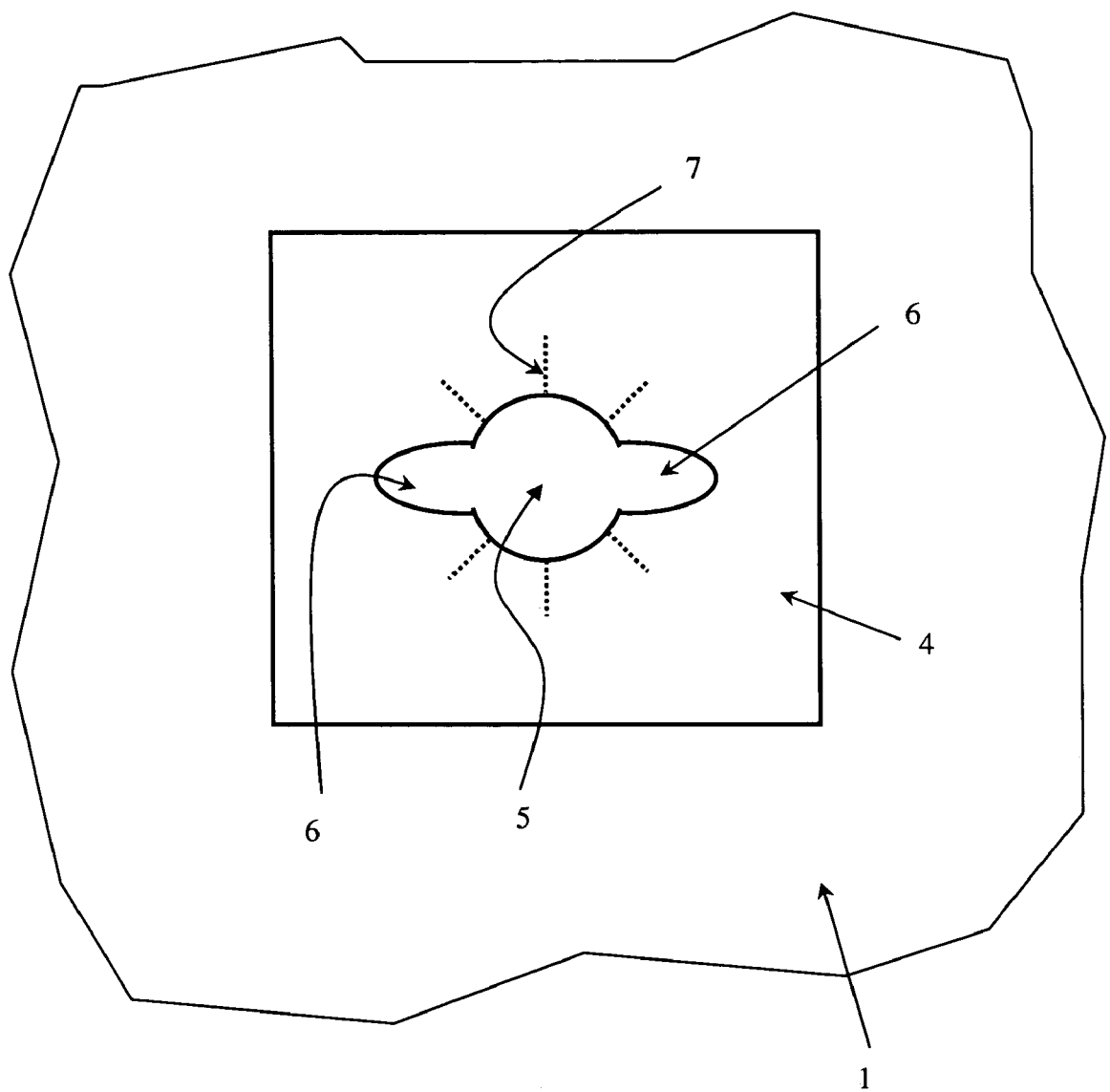
FIG. 4 shows an alternative design of a mounting plate of a disposable open bag of the present invention.

The vent opening(s) 6 can also be of any suitable size that would allow air pressure to equalize very quickly between inside and outside of the bag 100. It can comprise at least one opening, or it can be an array of holes or a mesh-like opening. The vent opening(s) 6 can have any shape, such as circular, oval, rectangular or irregular shape. FIG. 4 shows a variation in the design of the mounting plate 4 in which the openings 5 and 6 are connected. Alternatively, the vent opening(s) 6 does not have to be on the mounting plate 4. The vent opening(s) 6 can be at any location on the body 1 of the bag 100 as well as at multiple locations. Holes that are formed during a material manufacturing process can function as the vent openings. Materials which have holes, e.g., materials that have good air permeability property, are woven material, non-woven material, netting and screen material. For example, a non-woven material, such as spunbond made from polypropylene, has an open structure that allows air to flow through it. This open structure can function as the vent openings of the present invention.

The disposable open bag 100 can comprise a water permeable or water impermeable material. Water permeable material means that water can flow through the material. Water impermeable material means it is not water permeable. For wet pick-up during vacuum operation, a water impermeable bag is desired. Suitable water permeable materials are woven material, non-woven material, paper, netting, screen, and/or composites thereof. Suitable water impermeable materials are polymeric films. The material can be a flexible, and thin material. Specific examples, include, but are not limited to, paper bags, Glad plastic trash bags (manufactured by The Glad Product Company, of Oakland, Calif.). Examples of polymers that can be used to make plastic bags include, but are not limited to, polyethylene, polypropylene, nylon. Multilayer film can also be used to make stronger and more durable bags, such as polyethylene-nylon-polyethylene film or polypropylene-nylon-polypropylene. The disposable open bag 100 of the present invention is preferred to be made from a polymer film, which has a film thickness of less than 1 mm, and preferable less than 0.5 mm.

The mounting plate 4 is preferably made of a rigid material, such as paperboard or plastic sheet. Specific examples, include, but are not limited to, recycled chipboard or from recycled liner board, because this material is cost effective and recycled. Alternatively, it can be made from virgin paperboard or partially recycled paperboard such as solid bleach sulfite, solid unbleach sulfite. The mounting plate 4 can also be made from a polymer, such as polypropylene sheet. Preferably the thickness of the mounting plate 4 is 1.5 mm, but can be in a range of 0.5 to 5 mm.

In an alternative embodiment, the mounting plate 4 is not attached to the bag 100, but is provided separately, or as a disposable bag assembly unit that comprises the mounting plate and the bag. For example, the mounting plate 4 can be coated with a pressure sensitive adhesive, and the adhesively coated side of the mounting plate 4 is protected by a released paper. The bag 100 can be pre-cut with hole(s) on the body 1 that would match hole(s) on the mounting plate 4. The user would peel off the released paper and attach the mounting plate 4 to the bag 100 at the pre-cut hole(s) before the bag 100 is used in a shop vacuum cleaner. Alternatively, the mounting plate 4 could function as a clamp or an o-ring without a pressure sensitive adhesive coating. The bag 100 can be pre-cut with holes(s) on the body 1 that would matched holes(s) on the mounting plate 4. The user would attach the bag 100 to the inlet 11 first, then the mounting plate 4. Therefore, the mounting plate prevents the bag from coming off the inlet.

To close the opening(s) on the mounting plate 4 after the bag 100 is full of debris, the bag 100 is provided with a self-adhesive sticker protected by a released paper. The self-adhesive sticker is large enough to cover the entire mounting plate 4. The self-adhesive sticker can be attached to the body 1 of the bag 100 during manufacturing. The user would remove the sticker from the released paper and tape off the opening(s) on the mounting plate 4 before tying off the bag. The self-adhesive sticker can be an adhesively coated paper or adhesively coated polymeric film.

In addition to the mounting plate, other connection means can be utilized to connect the bag opening to the intake outlet of the vacuum cleaner. For example, it can comprise an elastic or fastener collar for removably attaching the opening to the intake. The opening can comprise an elastic collar or band that fits snugly around the intake opening.

Figure 5:
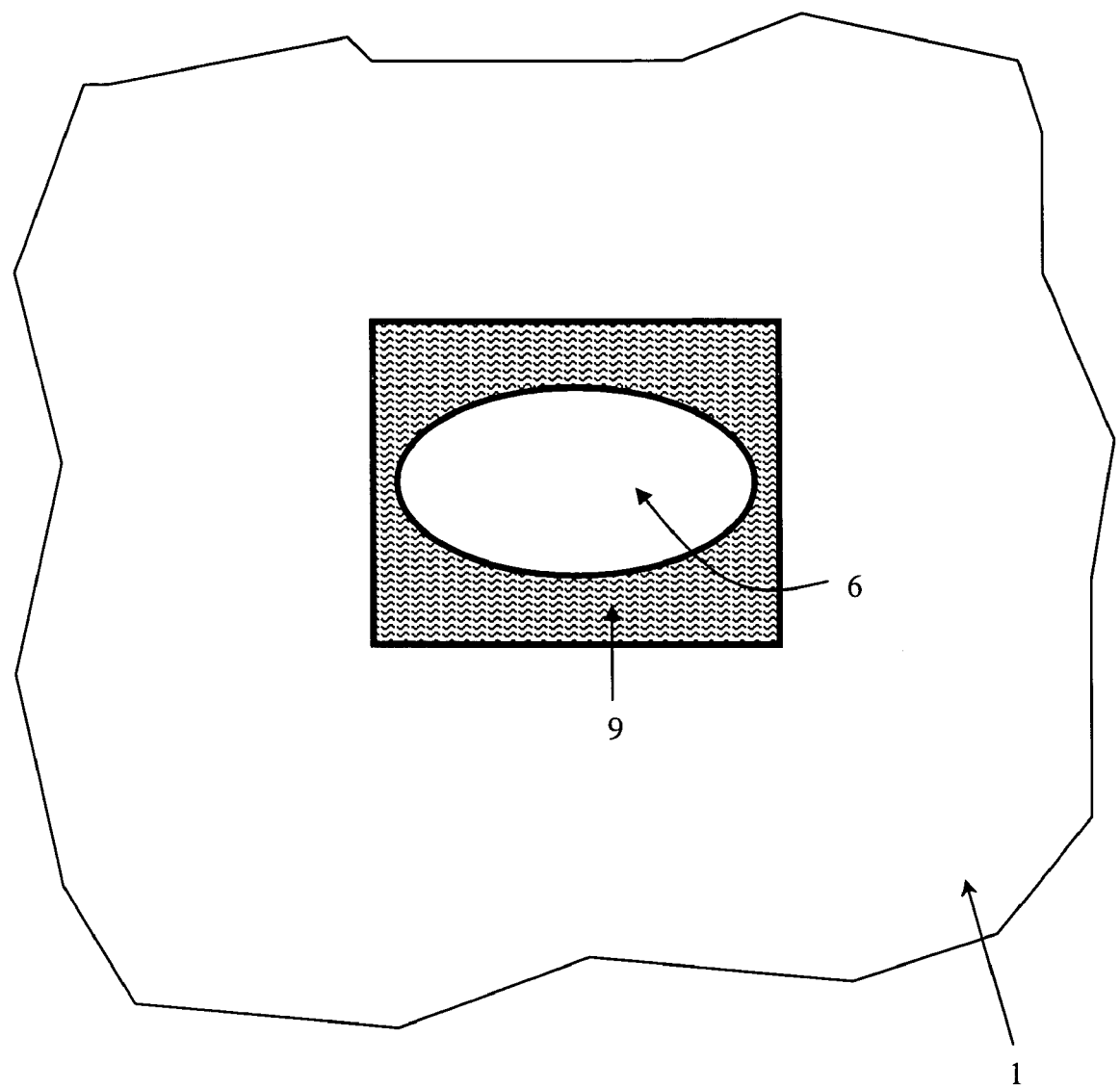
FIG. 5 shows a piece of loop material attached to the outside of a disposable open bag.
Figure 6:
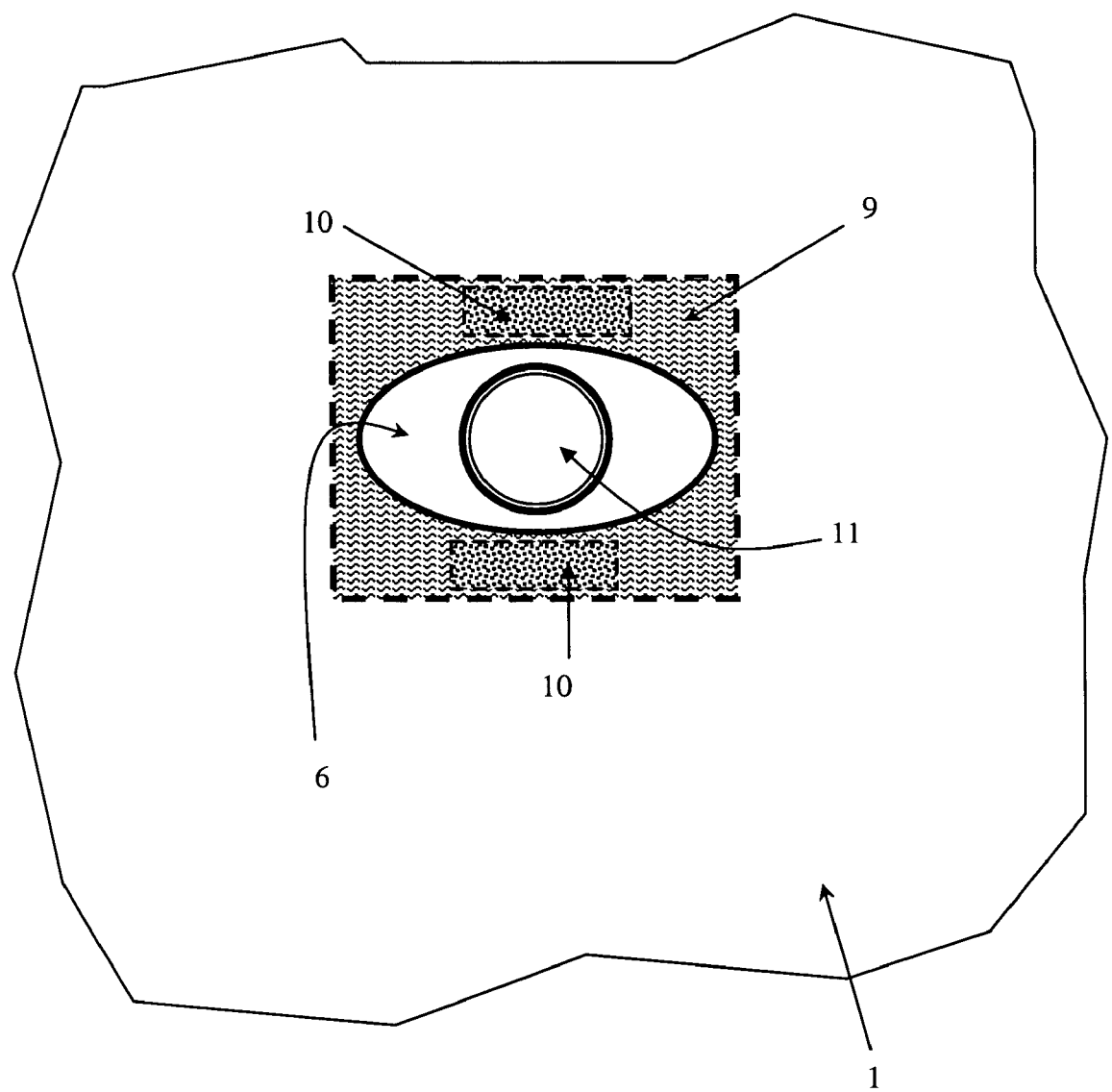
FIG. 6 shows the attachment of a disposable open bag to the tank of a shop vacuum cleaner using hook and loop materials.

Hook and loop of a mechanical fastening system can also be used in place of the mounting plate 4. Hook and loop mechanical fasteners are available from Velcro USA Inc. of Manchester, N.H. Loop (or hook) material 9 with adhesive backing are attached to the outside of the body 1 of the bag 100, and then the opening 6 was formed by cutting a hole through both the loop and the body 1 of the bag 100 (FIG. 5). Strips of hook (or loop) material 10 with adhesive backing (FIG. 6) are attached to the inside of the tank 13 within the vicinity of the inlet 11. When the bag 100 is used in a shop vacuum cleaner, the hook and loop materials are engaged and they secure the opening 6 on the body 1 of the bag 100 around the inlet 11.

When using the bag 100 with a shop vacuum cleaner, the user first removes the vacuum motor lid assembly 14 from the shop vacuum cleaner 20. The bag is then inserted into the tank 13, draping all excess bag height over the edge of the tank 13. The user lines up the mounting plate 4 with the inlet 11 and fully opens the bag 100 inside the tank 13 to ensure that the bag 100 is not bunched up and fully extended to the bottom of the tank 13. The user then inserts the opening 5 into the inlet 11. The vacuum motor lid assembly 14 is then mounted back.

During a vacuum operation, the motor 16 of the shop vacuum cleaner 20 removing air from the interior of the tank 13, and this creates a pressure drop (vacuum) within the tank 13. Air and entrained debris are drawn into the vacuum cleaner 20 through the hose 12, the inlet 11 and collected inside the bag 100. When the bag 100 is full, the user removes the vacuum motor lid assembly 14 from the shop vacuum cleaner 20 and removes the bag 100 from the tank 13. The opening(s) on the mounting plate 4 is taped off with the provided sticker before tying off the bag. Therefore, the disposable open bag of the present invention provides a clean and convenient way to collect and dispose debris.

As will be apparent to those of ordinary skill within the art, numerous modifications may be made to the present invention without departing the spirit and scope thereof. This application is intended to cover any adaptations or variations thereof.

What is claimed is:

1. A water impermeable vacuum cleaner bag for use with a vacuum cleaner having a tank, comprising:

a bag body comprised of a water impermeable material and having an opened end and a closed end, wherein the said bag body fits into said vacuum cleaner tank; and wherein the wall of said bag body has a wall opening attached to a rigid mounting plate, said mounting plate having a mounting plate opening to receive an intake outlet from said vacuum cleaner, said mounting plate opening being aligned with said wall opening on said bag body; and wherein the mounting plate comprises at least one vent opening through which air pressure can equalize between inside and outside the bag, said vent opening being connected to the mounting plate opening.

2. The water impermeable vacuum cleaner bag of claim 1, wherein said mounting plate is removable from said bag body.

3. The water impermeable vacuum cleaner bag of claim 1, wherein said mounting plate comprises a paperboard, a polymeric board, a polymeric foam board, or a composite thereof.

4. The water impermeable vacuum cleaner bag of claim 1, wherein said mounting plate comprises an elastic collar for removably attaching said opening to said intake outlet of said shop vacuum cleaner.

5. The water impermeable vacuum cleaner bag of claim 1, wherein said mounting plate comprises a fastener collar for removably attaching said opening to said intake outlet of said vacuum cleaner.

6. The water impermeable vacuum cleaner bag of claim 5, wherein said fastener collar comprises hook or loop mechanical fastening material.

7. The water impermeable vacuum cleaner bag of claim 1, wherein said opened end comprises a means for attaching said open end to said tank of said vacuum cleaner.

8. The water impermeable vacuum cleaner bag of claim 1, wherein said mounting plate opening fits over an intake outlet hose of said vacuum cleaner.

9. A water impermeable vacuum cleaner bag of claim 1, wherein said water impermeable material comprises polyethylene, polypropylene, nylon, polyethylene-nylon-polyethylene, or polypropylene-nylon-polypropylene.

10. A water impermeable vacuum cleaner bag of claim 1, wherein the wall opening is precut with holes that match the mounting plate opening and vent opening.

* * * * *